Patented Dec. 21, 1943

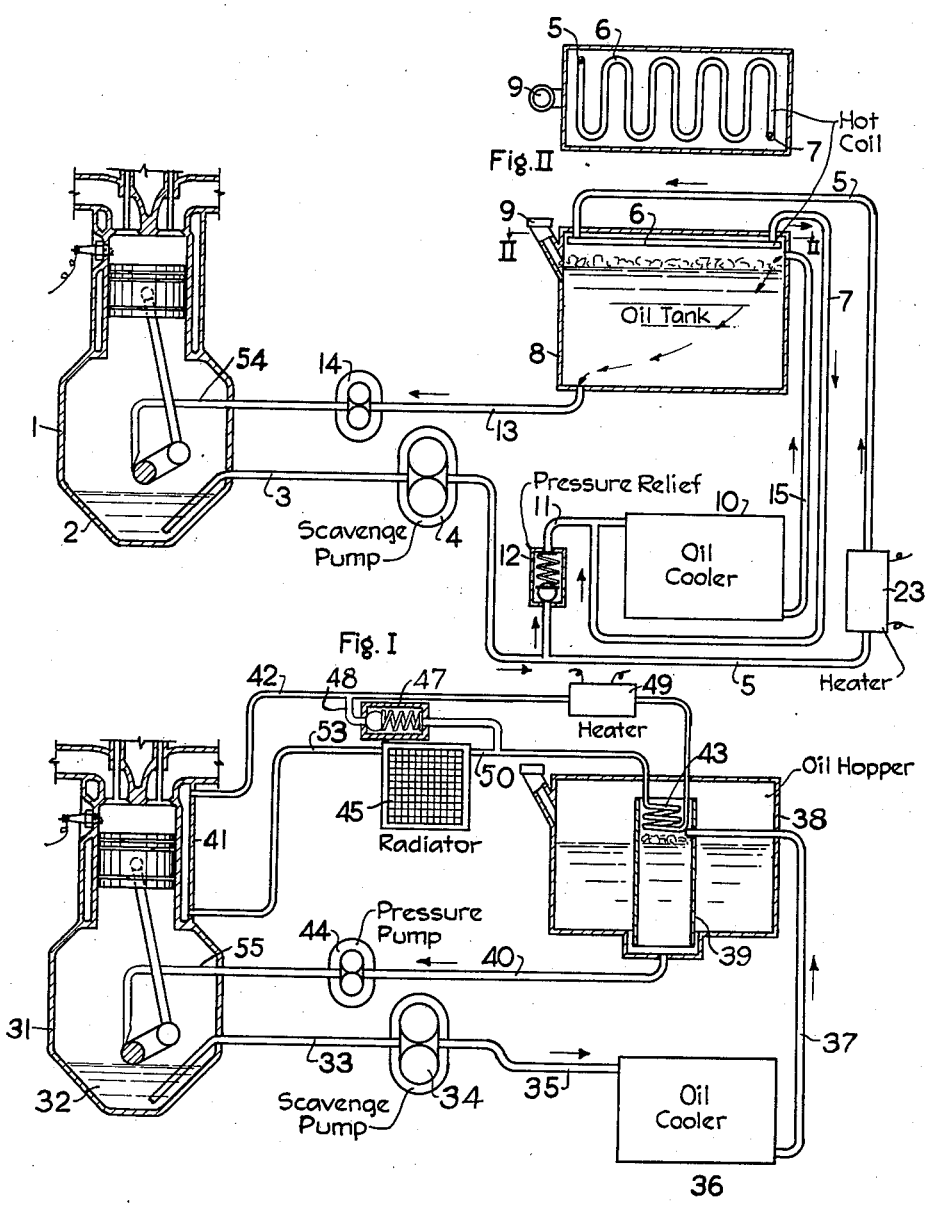

2,337,449

UNITED STATES PATENT OFFICE 2,337,449

APPARATUS FOR CONTROLLING FOAM FORMATION IN LUBRICATING SYSTEMS

Alfred G. Cattaneo, Berkeley, and Ellis R. White, Albany, Calif., assignors to Shell Development Company, San Francisco, Calif., a corporation of Delaware.

Application May 16, 1942, Serial No. 443,324

9 Claims. (Cl. 123—196)

The present invention relates to an improved system for inhibiting oil-foam formation in lubricating systems.

In the operation of lubrication systems and particularly those of internal combustion engines there is often a tendency for foam to form, this tendency being particularly pronounced in the instance of aircraft engines.

In the field of lubricating systems in general lubricating oil foam formation, if allowed to proceed unhindered, will ultimately produce undesirable effects, due to improper lubrication of the machine which is being lubricated, or to more rapid deterioration of the lubricating oil, or both.

Foaming of aircraft engine lubricating oil is believed to be caused by mixing of air and oil by the scavenge pump in withdrawing oil from the engine oil sump. The presence of water in the oil also appears to enhance the formation of foam in aircraft lubricating systems, probably due at least in part to boiling of the water within the hot oil as reduced atmospheric pressures are encountered at high altitudes. Excessive foaming has been found to lead to loss of oil due to escape of oil froth through vent holes and the like. Further, after prolonged foaming, the pressure feed pump to the engine may encounter a mixture of air and oil and as a result may no longer be able to supply the necessary lubrication required by the bearing and other working parts of the engine.

It is an object of the present invention to provide a method and apparatus whereby the foaming of lubricating oil in lubricating systems may be controlled and the deleterious effects of excessive foaming avoided. A further object is to provide apparatus for this purpose, particularly adapted for use with internal combustion engines and easily attachable to existing internal combustion engines. Another object is to provide an anti-foaming device utilizing waste heat developed in an internal combustion engine as its source of energy. Still another object is to provide a defoaming device for lubricating systems which is entirely automatic in action and does not require any attention on the part of the operator, this being an important factor in the operation of aircraft engines.

Other objects, together with some of the advantages to be derived from utilizing the present invention, will become apparent from the following detailed description thereof, reference being had to the accompanying drawing, which constitutes a part of this specification, and wherein:

Figure I is a schematic elevation of one embodiment of the invention;

Figure II is a cross-sectional view through II—II of Figure I;

Figure III is a schematic elevation of a second embodiment of the invention.

It has been found that an oil foam may be broken by bringing it into contact with a surface which is maintained at an elevated temperature, optimum results being obtained when the heated surface is maintained at a temperature approximately 25° C. higher than that of the body of the foam, although satisfactory results have been attained in some cases with a temperature difference of only 10° C. In actual practice it has been found that the foam does not necessarily need to actually contact the surface of the foam breaking element and, in fact, in many instances the foam has been observed to break as it approaches the near proximity of the heated surface. For the purpose of the present specification, therefore, the term "foam contacting element" is intended to mean an element or surface either in contact with or in near proximity to the foam. In the present invention, advantage is taken of this phenomenon to control the formation of foam by positioning a heated element above the level of the oil in the oil supply tank, this being the region wherein the greater part of the foam accumulation generally takes place in aircraft engines.

Referring particularly to Figures I and II, oil is withdrawn from the sump 2 of engine 1 by means of conduit 3 and scavenge pump 4. A grid 6 formed of metal tubing is positioned within oil supply tank 8 above the level of the oil contained therein. Conduit 5 passes hot oil from scavenge pump 4 to grid 6, and conduit 7 passes hot oil from grid 6 to oil cooler 10. An auxiliary electrical heater 23 is also provided around a section of conduit 5. A by-pass conduit 11 including a pressure relief valve 12 is provided between conduit 5 and oil cooler 10.

Conduit 15 passes oil from oil cooler 10 to oil supply tank 8, from whence oil is drawn by pressure pump 14 through conduit 13 and into engine 1 via conduit 54 for lubricating purposes.

The operation of the system is as follows: Hot oil, usually at a temperature of about 120° C., is withdrawn from the engine sump 2 by means of scavenge pump 4, which has a capacity of approximately 18 gallons per minute. The hot oil is then pumped through conduit 5, grid coil 6 and conduit 7 to oil cooler 10, wherein the temperature is reduced to about 75° C. From oil cooler 10, the oil, still under the pressure of scavenge pump 4, passes through conduit 15 and into the oil supply tank 8. Cooled oil is withdrawn from oil supply tank 8 through conduit 13 by means of pressure pump 14 which has a capacity of about 9 gallons per minute. From pressure pump 14 the oil is discharged into the pressure lubricating system of the engine via conduit 54, from whence it eventually drains back into oil sump 2 and the cycle repeated. The most pronounced foam accumulation takes place at the point where the oil leaves conduit 15 and is passed into oil supply tank 8. The passage of hot oil directly from the engine through grid coil 6 maintains the coil at a temperature of the order of at least 25° C. higher than that of the oil entering the oil supply tank. As a result, the foam accumulated in the oil supply tank breaks as rapidly as it comes in contact with the surface of the grid coil.

If under exceptional circumstances it is found that there is a tendency for foam to accumulate in the oil supply tank during periods when the oil in the engine sump is not at an advanced temperature, as for example during starting of the engine, auxiliary heater 23 may be employed to raise the temperature of the oil circulating through grid coil 6 to foam breaking temperatures. As a safety measure, by-pass conduit 11 including a pressure relief valve 12 is provided. By means of this arrangement oil will be passed directly from scavenge pump 4 to oil cooler 10 and thence to oil supply tank 8 in the event that a stoppage should occur in conduits 5 or 7 or in grid coil 6.

Referring to the embodiment of the invention shown in Figure III, oil is withdrawn from sump 32 of internal combustion engine 31 by means of scavenge pump 34 through conduit 33. From scavenge pump 34 oil passes through conduit 35, oil cooler 36 and conduit 37 to oil hopper 38 which is provided with a central well 39, as shown, and into which the oil from conduit 37 is discharged. Conduit 40 leads from the bottom of hopper 38 to pressure pump 44 which forces the oil into the lubrication system of the engine under pressure via conduit 55. In this arrangement the foam accumulation region, i. e. the region wherein the greatest foam accumulation occurs, is immediately above the oil level in center well 39 of hopper 38. A conduit 43 in the form of a coil is positioned above the oil level in hopper 38 and within center well 39 thereof. In this system, which is suitable for use only with liquid-cooled engines, hot cooling liquid at a temperature higher than that of the oil from cooler 36 is passed from the cooling jacket 41 of the engine to coil 43 through conduit 42. From coil 43 the liquid coolant is passed through conduit 50 to the radiator 45 or other heat exchange device which cools the liquid coolant prior to its return through conduit 53 to the cooling jacket 41 of the engine.

As described above in relation to the embodiment of Figure I, when there is a tendency for foam to accumulate before the engine attains its normal operating temperature, an auxiliary heater as at 49 may be employed to heat the fluid passed to the foam breaking element 43. As a safety measure, a by-pass conduit 48 including a pressure relief valve 47 may be included which will permit the engine coolant to circulate directly from the engine cooling jacket 41 to radiator 45 and thence back to the engine head in the event that coil 43 or its connecting conduits should become plugged.

Although the embodiments of the invention disclosed above are preferred for practical reasons, it is to be understood that other means may be employed to supply heat to the foam breaking element, as for example hot exhaust gases or an electrical heating element. The embodiments described in Figures I and II have the particular advantage that they require no thermostatic regulation, since the range of temperatures of both the engine oil and the liquid coolant, in the instance of liquid cooled engines, is within the preferred range of temperatures suitable for foam breaking purposes. It has been found that the foam breaking element should be maintained at a temperature of the order of 25° C. higher than that of the foam, and in no instance less than 10° C. higher than the temperature of the foam. Temperatures more than 25° C. higher than the temperature of the foam may also be utilized, although care must be taken to avoid such high temperatures as may cause physical damage and deterioration of the oil.

It is to be pointed out that according to the present invention the foam is broken by "shock" heating, as differentiated from a simple heating of the body of the foam. By "shock" heating is meant the rapid heating, even though over only a relatively narrow temperature range, of a relatively small area of the foam surface. It has been found that if the whole of a body of foam is gradually heated to a 10° C. to 25° C. temperature increase or more, the foam merely increases in volume. If, on the other hand, as according to the present invention, the upper surface of a foam body is brought in contact with or near proximity to a surface which is maintained at a temperature at least approximately 10° C. higher than the body of the foam, an immediate breaking of each succeeding foam surface takes place as it approaches or contacts the heated surface due to the thermal shock effect. The optimum temperature differential for breaking foams formed from a large number of different types of lubricating oils appears to be about 25° C., although, as has been pointed out above, a 10° C. temperature differential has been found to be satisfactory in certain instances.

Although the invention has been described in relation to its adaptation to lubrication systems of internal combustion engines, it is to be understood that the principles set forth may be applied to the lubrication system of any type of engine and, in general, to any lubricating system for engines or other machinery wherein there is a tendency for oil foam to form. As has been disclosed above, such foaming conditions may be controlled by positioning a foam contacting element above the oil level in an oil reservoir of the system or in whatever region the foam accumulation tendency is greatest and maintaining the foam contacting element at thermal shock temperatures, but below temperatures at which the oil may be damaged. It is preferable that the temperature of the foam contacting element should not exceed approximately 100° C. when used to control lubricating oil foams.

We claim as our invention:

1. In an engine lubricating system including an oil cooler, an oil reservoir and means arranged and adapted to circulate oil from said reservoir to an engine, thence to said oil cooler and from said oil cooler back to said oil reservoir, a foam controlling device comprising a foam contacting element disposed above the oil level in said oil reservoir and in the foam accumulation region and means arranged and adapted to circulate a fluid through said foam contacting element at thermal shock temperatures and below the temperature at which substantial deterioration of the oil takes place.

2. The arrangement according to claim 1 wherein at least a portion of the circulating oil is passed through the foam contacting element after passing through the engine and prior to passing through the oil cooler.

3. In an internal combustion engine lubricating system including an oil sump, an oil cooler, an oil supply tank and means arranged and adapted to circulate oil from said oil supply tank to the working parts of an internal combustion engine, thence to said oil sump, thence to said oil cooler and thereafter back to said oil supply tank, a foam controlling device comprising a tubular grid positioned above the oil level in said oil supply tank and in the foam accumulation region and means arranged and adapted to pass at least a portion of the circulating oil through said tubular grid after passing through said oil sump and prior to passing through said oil cooler.

4. In a liquid-cooled internal combustion engine the combination comprising a radiator, means arranged and adapted to circulate liquid coolant from said engine through said radiator and back to said engine, an oil reservoir, means arranged and adapted to circulate oil from said oil reservoir to the working parts of said engine and back to said oil reservoir, a foam contacting device positioned above the oil level of said oil reservoir and in the foam accumulation region and means arranged and adapted to pass at least a portion of said liquid coolant through said foam contacting device prior to passing through said radiator.

5. In an internal combustion aircraft engine lubricating system, the combination comprising an oil sump, an oil cooler, an oil supply tank, a foam contacting grid positioned above the oil level in said oil supply tank and in the foam accumulation region, conduit means including a scavenge pump between said oil sump and said grid, conduit means between said grid and said oil cooler, conduit means between said oil cooler and said oil supply tank, and conduit means including a pressure pump arranged and adapted to pass oil from said oil supply tank through an internal combustion aircraft engine and thence to said oil sump.

6. The arrangement according to claim 5 including a conduit including a pressure relief valve between the conduit leading to the foam contacting grid and the oil cooler.

7. In an engine lubricating system including a lubricant cooler, a lubricant reservoir and means arranged and adapted to circulate lubricant from said reservoir to an engine, thence to said lubricant cooler and from said lubricant cooler back to said reservoir, a foam controlling device comprising a foam contacting element disposed in a foam accumulation region of said lubricating system after said cooler and means arranged and adapted to maintain said foam contacting element at thermal shock temperature and below the temperature at which substantial deterioration of the lubricant takes place.

8. The arrangement according to claim 7 wherein the foam contacting element is maintained at a temperature at least approximately 10 degrees C. above that of the body of the foam in the foam accumulation region.

9. The arrangement according to claim 7 the foam contacting element is maintained at a temperature approximately 25 degrees C. above that of the body of the foam in the foam accumulation region.

ALFRED G. CATTANEO.
ELLIS R. WHITE.